US012567903B2

(12) United States Patent
Jo et al.

(10) Patent No.: US 12,567,903 B2
(45) Date of Patent: Mar. 3, 2026

(54) OPERATION METHOD OF NETWORK CONTROLLER USING UNIQUE IDENTIFICATION INFORMATION OF CELLS AND CLUSTERS AND ELECTRONIC DEVICE FOR PERFORMING THE SAME

(71) Applicant: AGENCY FOR DEFENSE DEVELOPMENT, Daejeon (KR)

(72) Inventors: Byung Gak Jo, Daejeon (KR); Yong Up Jang, Daejeon (KR); Jae Hyun Ham, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 319 days.

(21) Appl. No.: 18/406,443

(22) Filed: Jan. 8, 2024

(65) Prior Publication Data

US 2024/0235660 A1     Jul. 11, 2024

(30) Foreign Application Priority Data

Jan. 11, 2023     (KR) ........................ 10-2023-0004088

(51) Int. Cl.
*H04B 7/185*          (2006.01)
(52) U.S. Cl.
CPC ..... *H04B 7/18519* (2013.01); *H04B 7/18513* (2013.01)
(58) Field of Classification Search
CPC ............ H04B 7/18519; H04B 7/18513; H04B 7/18541; H04B 7/2041; H04B 7/212;
(Continued)

(56) References Cited

U.S. PATENT DOCUMENTS

| | | | |
|---|---|---|---|
| 5,867,765 | A | 2/1999 | Nilsson |
| 6,091,936 | A | 7/2000 | Chennakeshu et al. |

(Continued)

FOREIGN PATENT DOCUMENTS

| | | |
|---|---|---|
| JP | 2004-128658 A | 4/2004 |
| KR | 1998-0703422 A | 11/1998 |

(Continued)

OTHER PUBLICATIONS

Notice of Reasons for Rejection issued on Jun. 21, 2024 in corresponding KR Application No. 10-2023-0004088.

*Primary Examiner* — Don N Vo
(74) *Attorney, Agent, or Firm* — MILES & STOCKBRIDGE P.C.

(57)          ABSTRACT

Provided is an operation method of a network controller supporting communication by using a unique cell number and cluster number. The operation method of the network controller includes identifying identification information corresponding to each of at least one cell, identifying identification information corresponding to each of at least one cluster including the at least one cell, identifying identification information corresponding to at least one cluster and at least one cell corresponding to a first area covered by a beam transmitted from a first satellite, identifying identification information corresponding to at least one cluster and at least one cell corresponding to a second area not covered by the beam due to movement of the first satellite, and identifying information on a second satellite covering the second area.

10 Claims, 10 Drawing Sheets

(58) Field of Classification Search
    CPC ....... H04W 8/26; H04W 36/32; H04W 84/06;
                              H04W 88/12
    USPC ....................................................... 455/427
    See application file for complete search history.

(56) References Cited

U.S. PATENT DOCUMENTS

| | | | |
|---|---|---|---|
| 6,236,375 B1 | 5/2001 | Chandler et al. | |
| 2006/0094420 A1* | 5/2006 | Karabinis ............ | H04B 7/1853 |
| | | | 455/427 |
| 2010/0099428 A1 | 4/2010 | Bhushan et al. | |
| 2013/0034050 A1* | 2/2013 | Ros .................... | H04B 7/18528 |
| | | | 370/316 |
| 2018/0359670 A1* | 12/2018 | Fang ................... | H04W 36/085 |
| 2021/0037493 A1* | 2/2021 | Gulati ................... | H04W 92/18 |
| 2023/0024479 A1 | 1/2023 | Ciochina et al. | |
| 2023/0336241 A1* | 10/2023 | Kim ...................... | H04W 68/02 |

FOREIGN PATENT DOCUMENTS

| | | | |
|---|---|---|---|
| KR | 2000-0004997 A | 1/2000 | |
| KR | 2022-0124233 A | 9/2022 | |

* cited by examiner

Figure 4C:
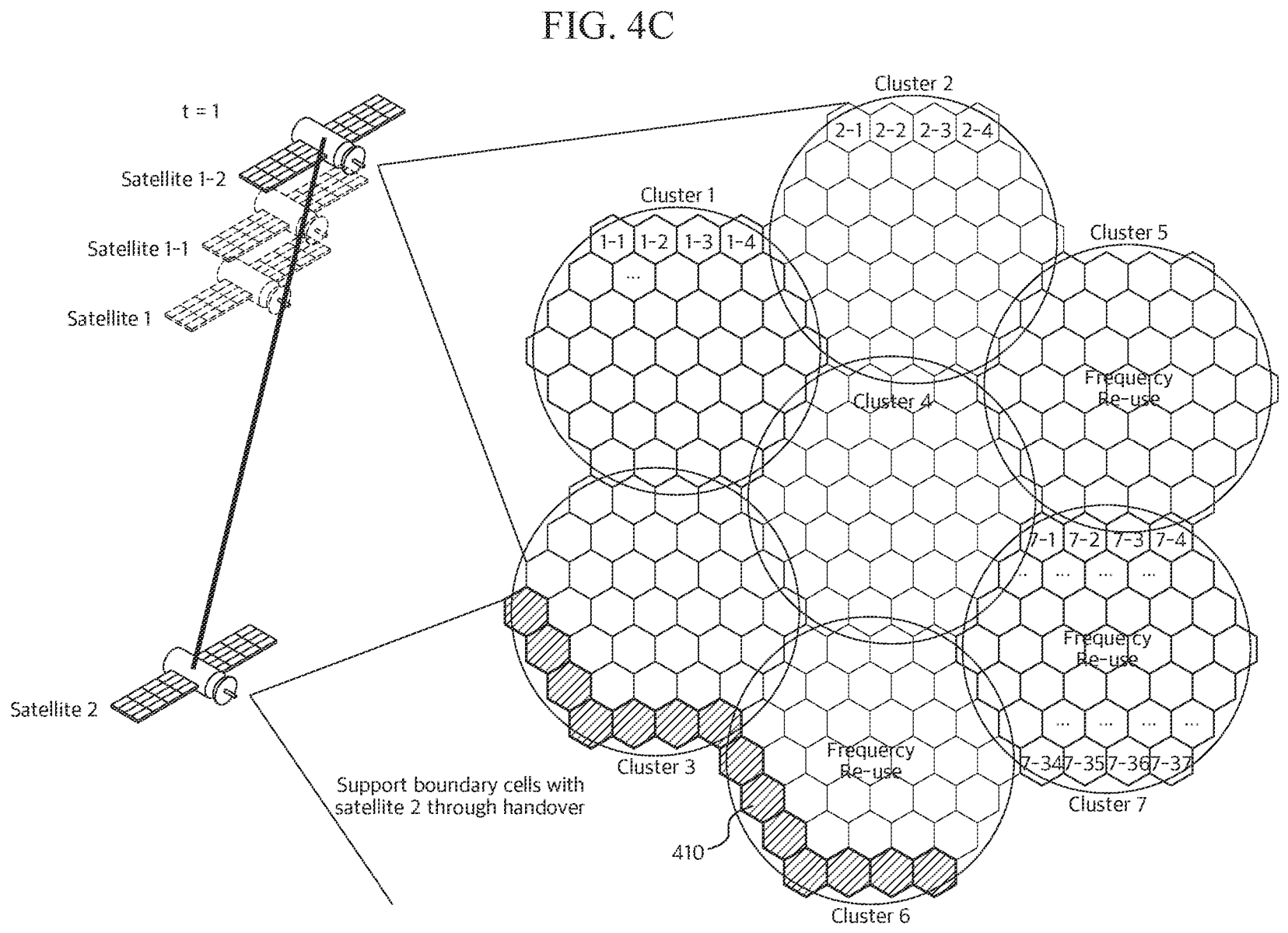

Cluster 5

Cluster 2

2-1 2-2 2-3 2-4

Cluster 1

1-1 1-2 1-3 1-4

Frequency Re-use

Cluster 4

7-1 7-2 7-3 7-4

Frequency Re-use 7-347 7-357 7-367 7-37

Cluster 7

Cluster 3

Frequency Re-use

Cluster 6

410 t = 1

Satellite 1-2

Satellite 1-1

Satellite 1

Satellite 2

Support boundary cells with satellite 2 through handover

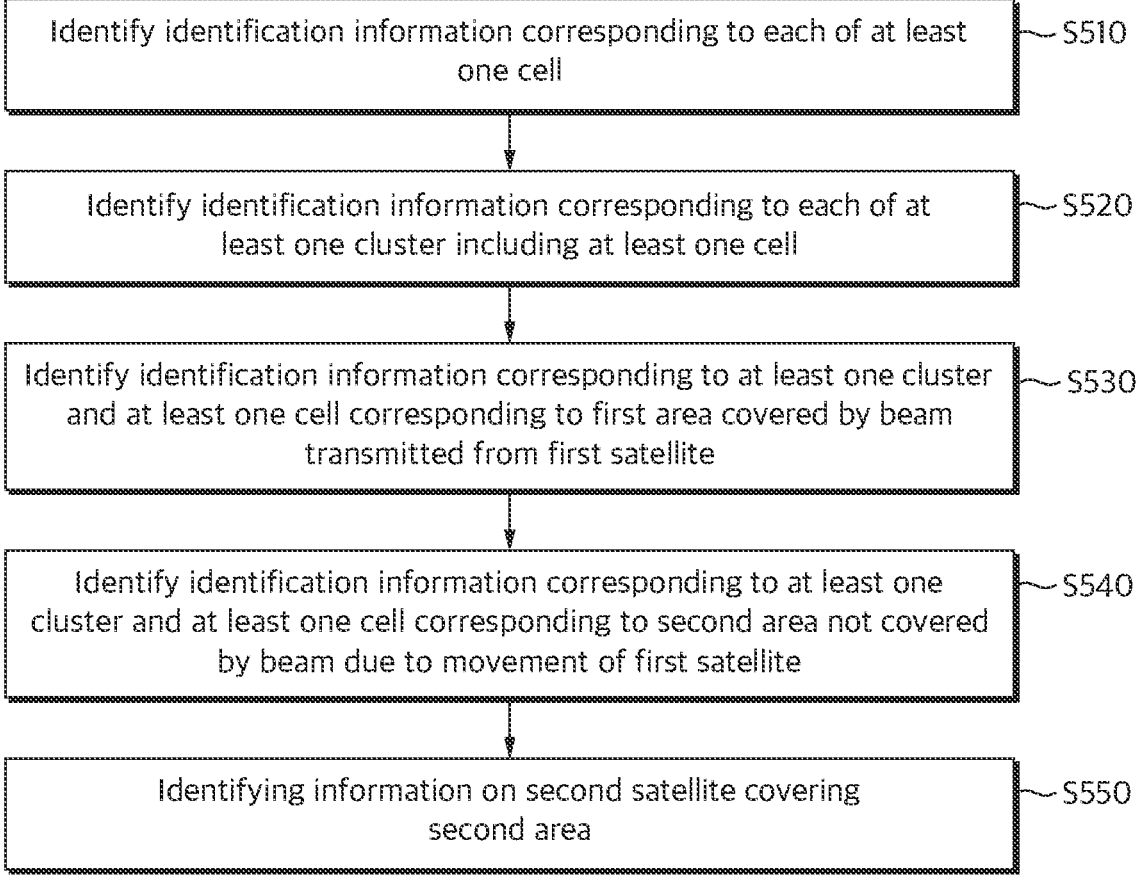

Identify identification information corresponding to each of at least one cell ~S510

Identify identification information corresponding to each of at least one cluster including at least one cell ~S520

Identify identification information corresponding to at least one cluster and at least one cell corresponding to first area covered by beam transmitted from first satellite ~S530

Identify identification information corresponding to at least one cluster and at least one cell corresponding to second area not covered by beam due to movement of first satellite ~S540

Identifying information on second satellite covering second area ~S550

OPERATION METHOD OF NETWORK CONTROLLER USING UNIQUE IDENTIFICATION INFORMATION OF CELLS AND CLUSTERS AND ELECTRONIC DEVICE FOR PERFORMING THE SAME

PRIORITY INFORMATION

This application claims the benefit of Korean Patent Application No. 10-2023-0004088, filed on Jan. 11, 2023 in the Korean Intellectual Property Office, the disclosure of which is incorporated herein by reference in its entirety.

FIELD OF THE INVENTION

Example embodiments relate to systems, devices, methods, and/or instructions for efficiently processing network control by using unique identification information on a cell and a cluster fixed at a predetermined ground location with a beam steering function even if a satellite moves.

DESCRIPTION OF THE RELATED ART

In related arts, cell and cluster numbers are assigned and managed around a satellite as a center when the satellite performs beam hopping time division multiple access (TDMA) communication. Thus, when a low-orbit satellite moves along an orbital plane, clusters and cells assigned to the satellite move together. Therefore, a ground terminal has been required to perform a handover between cells, a handover between clusters, and a handover between satellites with movement of the satellite, which may be a great burden in a process of a network controller managing a network because frequent handover is needed in consideration of a low-orbit satellite environment in which the satellite moves at a high speed. Particularly, in a beam hopping system, the ground terminal may not continuously receive a signal from the satellite and may receive the signal only for a short time corresponding to its own time slot with a TDMA method, which may have been a greater burden. Accordingly, technology of simplifying the handover and facilitating network control and resource allocation is required even if the satellite moves at a high speed.

SUMMARY OF THE INVENTION

Accordingly, the embodiments provide systems, devices, methods, and/or instructions for efficiently processing network control by using unique identification information on a cell and a cluster fixed at a predetermined ground location with a beam steering function even if a satellite moves. However, the example embodiments of the present disclosure are not limited to the aspects and objectives described above and other objects may be inferred from the following example embodiments.

According to an aspect, there is provided an operation method performed in a network controller, the operation method including identifying identification information corresponding to each of at least one cell, identifying identification information corresponding to each of at least one cluster including the at least one cell, identifying identification information corresponding to at least one cluster and at least one cell corresponding to a first area covered by a beam transmitted from a first satellite, identifying identification information corresponding to at least one cluster and at least one cell corresponding to a second area not covered by the beam due to movement of the first satellite, and identifying information on a second satellite covering the second area.

The identification information corresponding to the at least one cluster and the at least one cell corresponding to the second area may be unique identification information set in advance regardless of the movement of the first satellite.

A plurality of ground terminals included in the second area may be configured to perform communication regardless of the movement of the first satellite and based on the unique identification information which is on a cluster and a cell.

The identifying of the information on the second satellite may include identifying the information on the second satellite which is scheduled to cover the second area based on communication between the first satellite and the second satellite.

The operation method may further include transmitting information on the second area and the information on the second satellite through a control channel.

The second satellite may be configured to support communication of a plurality of ground terminals included in the second area.

A cell corresponding to the first area may correspond to an area covered by the beam transmitted from the first satellite, and a cluster corresponding to the first area may correspond to an area covered by hopping the beam.

The second area may be an area not covered by the beam with the movement of the first satellite despite hopping the beam.

According to another aspect, there is also provided a non-transitory computer-readable storage medium comprising a medium configured to store computer-readable instructions, and when executed by a controller, the computer-readable instructions allow the controller to perform an operation method in a network controller, the operation method including identifying identification information corresponding to each of at least one cell, identifying identification information corresponding to each of at least one cluster including the at least one cell, identifying identification information corresponding to at least one cluster and at least one cell corresponding to a first area covered by a beam transmitted from a first satellite, identifying identification information corresponding to at least one cluster and at least one cell corresponding to a second area not covered by the beam due to movement of the first satellite, and identifying information on a second satellite covering the second area.

According to still another aspect, there is also provided an electronic device including a communication device, a memory in which identification information corresponding to each of at least one cell and identification information corresponding to each of at least one cluster, and a controller configured to identify identification information corresponding to at least one cluster and at least one cell corresponding to a first area covered by a beam transmitted from a first satellite, identify identification information corresponding to at least one cluster and at least one cell corresponding to a second area not covered by the beam due to movement of the first satellite, and identify information on a second satellite covering the second area.

Additional aspects of example embodiments will be set forth in part in the description which follows and, in part, will be apparent from the description, or may be learned by practice of the disclosure. The objectives and other advantages of the disclosure will be realized and attained by the structure particularly pointed out in the written description and claims hereof as well as the appended drawings.

According to example embodiments, since a ground terminal may perform only a handover between satellites by using a unique cell number and cluster number with beam steering technology even if a satellite moves at a high speed, a network controller may easily manage a network. In addition, since the ground terminal does not perform a handover between cells and a handover between clusters, the network controller may further efficiently manage the network. The ground terminal may identify the unique cell number and cluster number which are set in advance and correspond to its own location. Thus, an additional exchange of a control message may not be required for identification of the cluster number and the cell number.

Effects of the present disclosure are not limited to those described above and other effects may be made apparent to those skilled in the art from the following description. It is to be understood that both the foregoing general description and the following detailed description are examples and explanatory and are intended to provide further explanation of the invention as claimed.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 4A through 4E are diagrams illustrating a process of a ground terminal communicating by using a cell and a cluster allocated unique identification information regardless of movement of a satellite according to an example embodiment;

FIG. 5 is a flowchart illustrating an operation method of a network controller according to an example embodiment.

DETAILED DESCRIPTION OF THE INVENTION

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

Throughout the specification, expression "at least one of a, b, and c" may include 'a only', 'b only', 'c only', 'a and b', 'a and c', 'b and c', or 'all of a, b, and c'.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily implement the present disclosure. The present disclosure may be embodied in many different forms and is not limited to the embodiments described herein.

Hereinafter, example embodiments of the present disclosure will be described with reference to the drawings.

Figure 1:
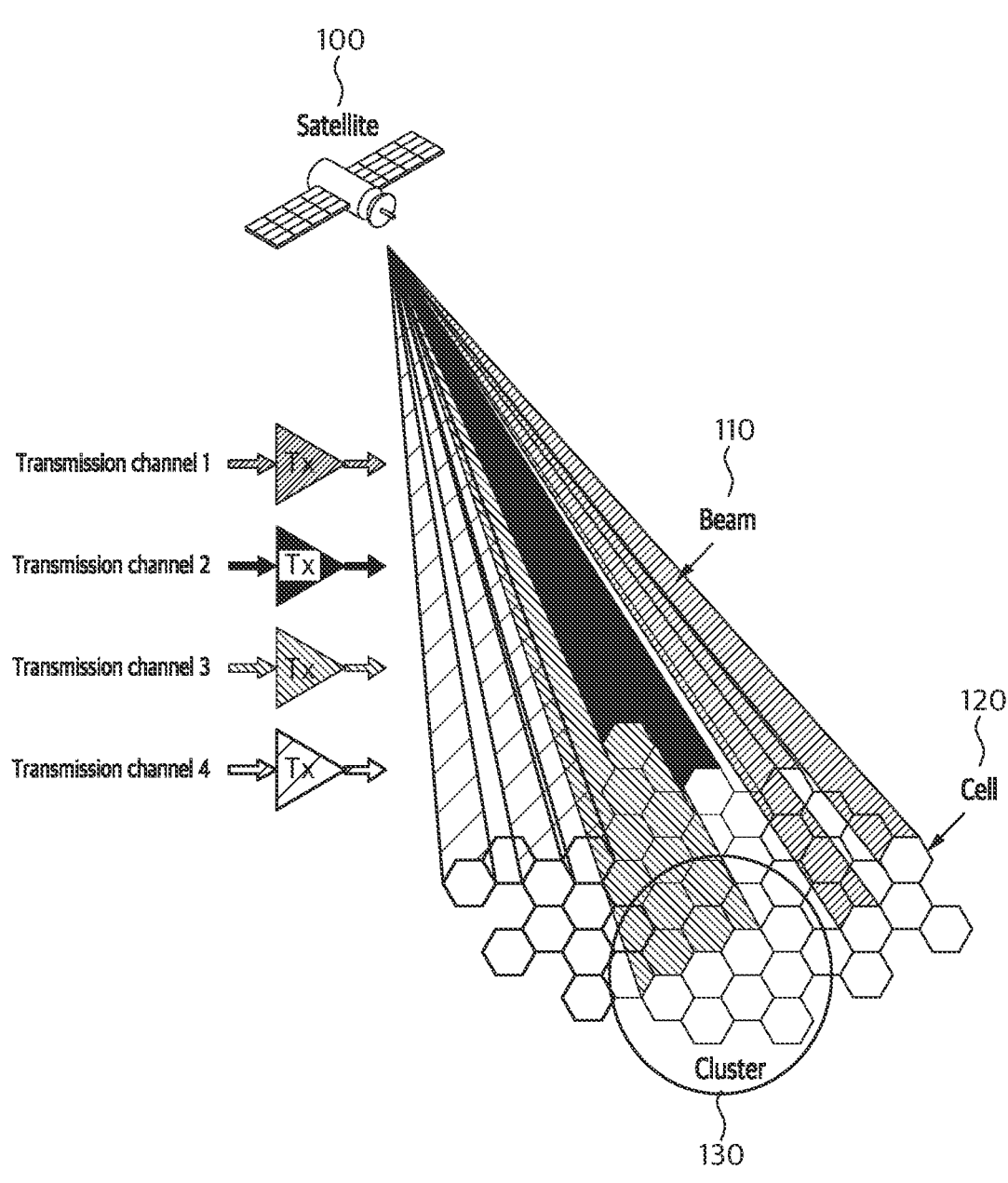
FIG. 1 is a diagram illustrating a cell and a cluster according to an example embodiment.

FIG. 1 is a diagram illustrating a cell and a cluster according to an example embodiment.

Referring to FIG. 1, a satellite 100 may transmit a beam 110 by using transmission channels different from each other. For example, the satellite 100 may transmit a beam by using a transmission channel 1. The satellite 100 may transmit a beam by using a transmission channel 2. The satellite 100 may transmit a beam by using a transmission channel 3. The satellite 100 may transmit a beam by using a transmission channel 4.

At this point, an area covered by the beam 110 transmitted by using a transmission channel may correspond to a cell 120. For example, one beam transmitted by using the transmission channel 1 may cover a corresponding first cell. One beam transmitted by using the transmission channel 2 may cover a corresponding second cell. One beam transmitted by using the transmission channel 3 may cover a corresponding third cell. One beam transmitted by using the transmission channel 4 may cover a corresponding fourth cell.

At this point, when beam hopping technology with which an electronically steerable antenna (ESA) provided to the satellite 100 changes a steering point of a beam over a time is applied, the one beam transmitted by using the transmission channel 1 may cover a cluster including a plurality of cells. For example, the one beam transmitted by using the transmission channel 1 may cover a first cluster including a plurality of cells with the beam hopping technology. The one beam transmitted by using the transmission channel 2 may cover a second cluster including a plurality of cells with the beam hopping technology. The one beam transmitted by using the transmission channel 3 may cover a third cluster including a plurality of cells with the beam hopping technology. The one beam transmitted by using the transmission channel 4 may cover a fourth cluster including a plurality of cells with the beam hopping technology. Thus, when the beam hopping technology is applied, a satellite may support communication in each area by covering a wide area with a small number of beams.

Figure 2:
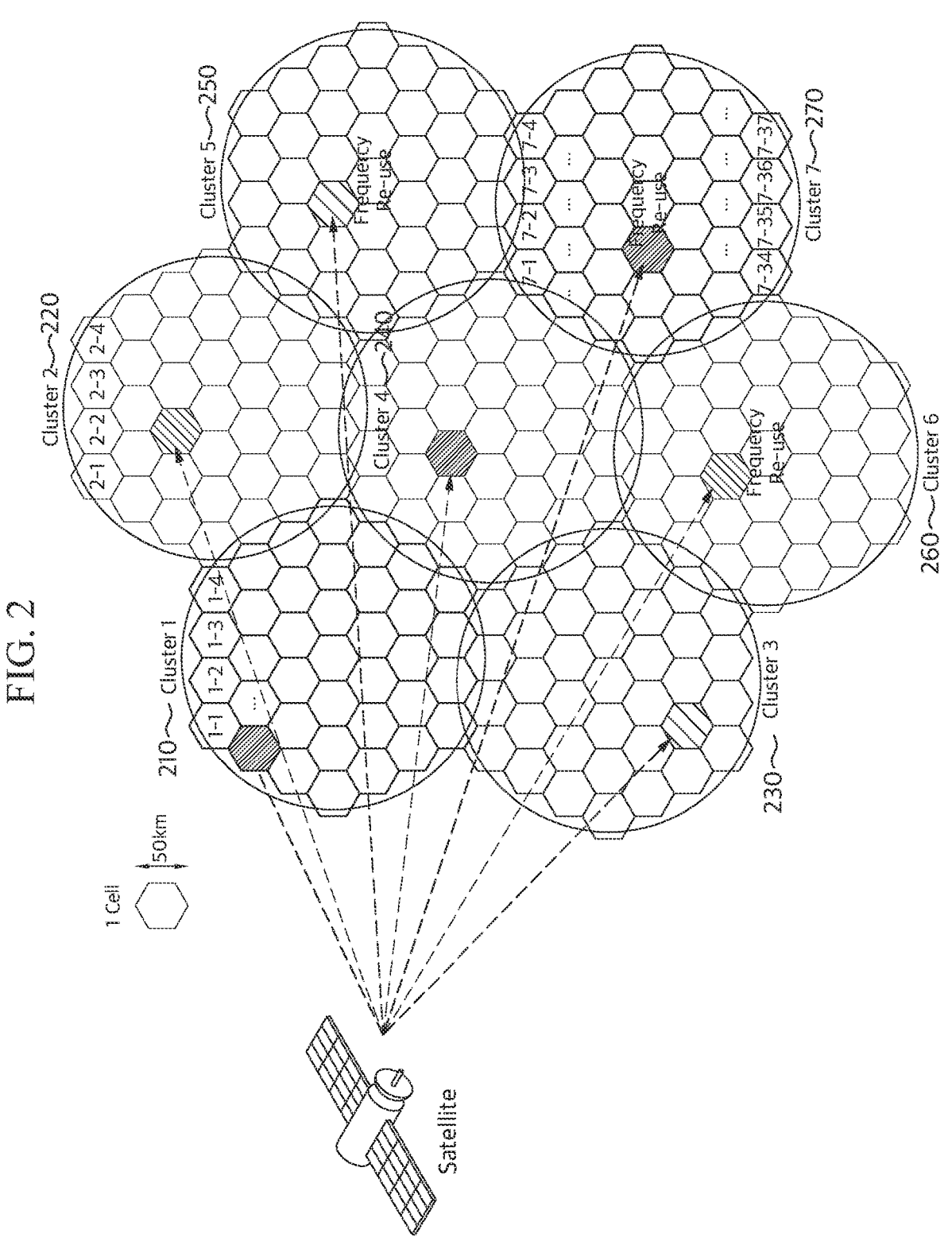
FIG. 2 is a diagram illustrating seven clusters covered by seven beams transmitted from a satellite according to an example embodiment.

FIG. 2 is a diagram illustrating seven clusters covered by seven beams transmitted from a satellite according to an example embodiment.

Referring to FIG. 2, a satellite may transmit the seven beams through each transmission channel and support communication in a large area corresponding to the seven cluster by applying beam hopping technology. A cell, for example, may be a hexagon of which a length of a side is fifty kilometers (km) or may be set to have other various sizes and shapes.

At this point, each cluster may correspond to an area including thirty-seven cells. For example, a cluster 1 of reference numeral 210 may correspond to an area including a cell 1-1 and a cell 1-2 through a cell 1-37 corresponding to a transmitted beam 1. A cluster 2 of reference numeral 220 may correspond to an area including a cell 2-1 and a cell 2-2 through a cell 2-37 corresponding to a transmitted beam 2. A cluster 3 of reference numeral 230 may correspond to an area including a cell 3-1 and a cell 3-2 through a cell 3-37 corresponding to a transmitted beam 3. A cluster 4 of reference numeral 240 may correspond to an area including a cell 4-1 and a cell 4-2 through a cell 4-37 corresponding to a beam 4. A cluster 5 of reference numeral 250 may correspond to an area including a cell 5-1 and a cell 5-2 through a cell 5-37 corresponding to a transmitted beam 5. A cluster 6 of reference numeral 260 may correspond to an area including a cell 6-1 and a cell 6-2 through a cell 6-37 corresponding to a transmitted beam 6. A cluster 7 of reference numeral 270 may correspond to an area including a cell 7-1 and a cell 7-2 through a cell 7-37 corresponding to a transmitted beam 7.

Figure 3:
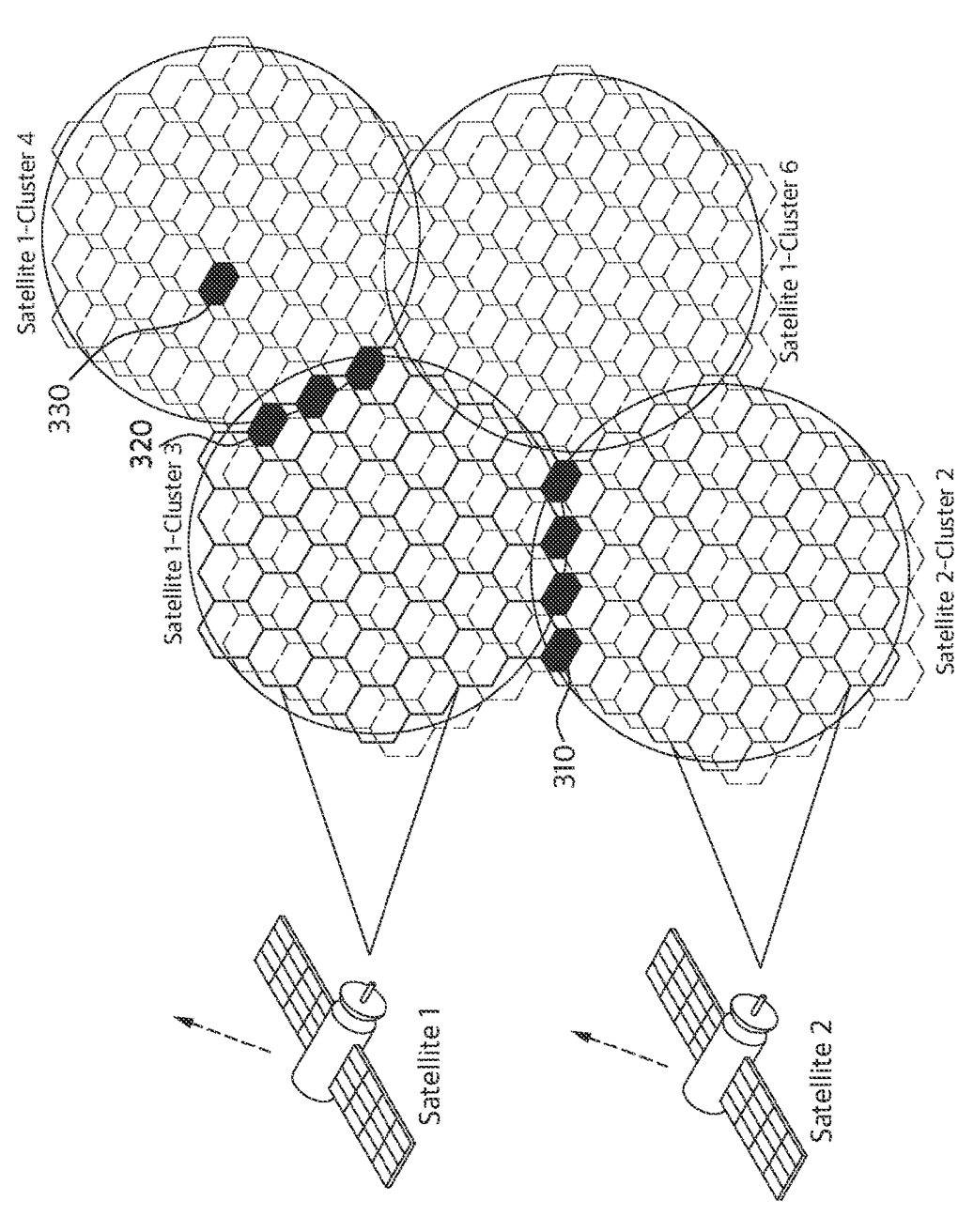
FIG. 3 is a diagram illustrating a process of an existing ground terminal communicating in consideration of movement of a cluster and a cell due to movement of a satellite.

FIG. 3 is a diagram illustrating a process of an existing ground terminal communicating in consideration of movement of a cluster and a cell due to movement of a satellite.

Referring to FIG. 3, in related arts, cells and clusters assigned to a satellite 1 and a satellite 2 may move as illustrated in FIG. 3 with the satellite 1 and the satellite 2 moving along an orbital plane. In this regard, with cell and cluster numbers being assigned around the satellite, the cluster and the cell may move to correspond to the movement of the satellite as illustrated by FIG. 3.

To this end, ground terminals included in each area may be to perform a handover between cells, a handover between clusters, and a handover between satellites depending on a location. For example, in related arts, when the satellite 1 and the satellite 2 move, ground terminals included in a cell corresponding to an area 310 (e.g., four cells illustrated in FIG. 3) may perform the handover between satellites from the satellite 1 to the satellite 2 with movement of the cluster. Specifically, with the movement of the cluster, the ground terminals included in the cell corresponding to the area 310 may be handed over from a cluster 3 of the satellite 1 to a cluster 2 of the satellite 2 to perform communication. Alternatively, in related arts, when the satellite 1 moves, ground terminals included in a cell corresponding to an area 320 (e.g., three cells illustrated in FIG. 3) may perform the handover between clusters from a cluster 4 to the cluster 3 with the movement of the cluster. Specifically, with the movement of the cluster, the ground terminals included in the cell corresponding to the area 320 may be handed over from the cluster 4 of the satellite 1 to the cluster 3 of the satellite 1 to perform communication. Alternatively, in related arts, when the satellite 1 moves, ground terminals included in a cell corresponding to an area 330 may perform the handover between cells from a cell 4-12 to a cell 4-18. Specifically, with movement of the cell, the ground terminals included in the cell corresponding to the area 330 may be handed over from the cell 4-12 to the cell 4-18 which are included in the cluster 4 of the satellite 1 to perform communication.

At this point, the ground terminals are required to frequently exchange a control message for identifying a corresponding cell number and cluster number. As an example, the ground terminals included in the area 320 are required to frequently exchange a control message for identifying that a corresponding cluster number is changed from that of the cluster 4 to that of the cluster 3. As another example, the ground terminals included in the area 330 are required to frequently exchange a control message for identifying that a corresponding cell number is changed from that of the cell 4-12 to that of the cell 4-18. Such as in related arts, a process of exchanging the control message for identifying a cell number and a cluster number changed due to the movement of the satellite may be a great burden to a ground terminal and a network controller managing a network. Also, in consideration of a satellite environment in which the satellite moves at a high speed of approximately 7.558 kilometers per second (km/s), the ground terminal may frequently perform a handover in related arts. Thus, in related arts, the ground terminal and the network controller managing the network may have a burden of processing the frequent handover. Particularly, in a beam hopping system, the ground terminal may not continuously receive a signal from the satellite and may receive the signal only for a short time corresponding to its own time slot with a time division multiple access (TDMA) method, which may be a greater burden.

FIGS. 4A through 4E are diagrams illustrating a process of a ground terminal communicating by using a cell and a cluster allocated unique identification information regardless of movement of a satellite according to an example embodiment.

Figure 4A:
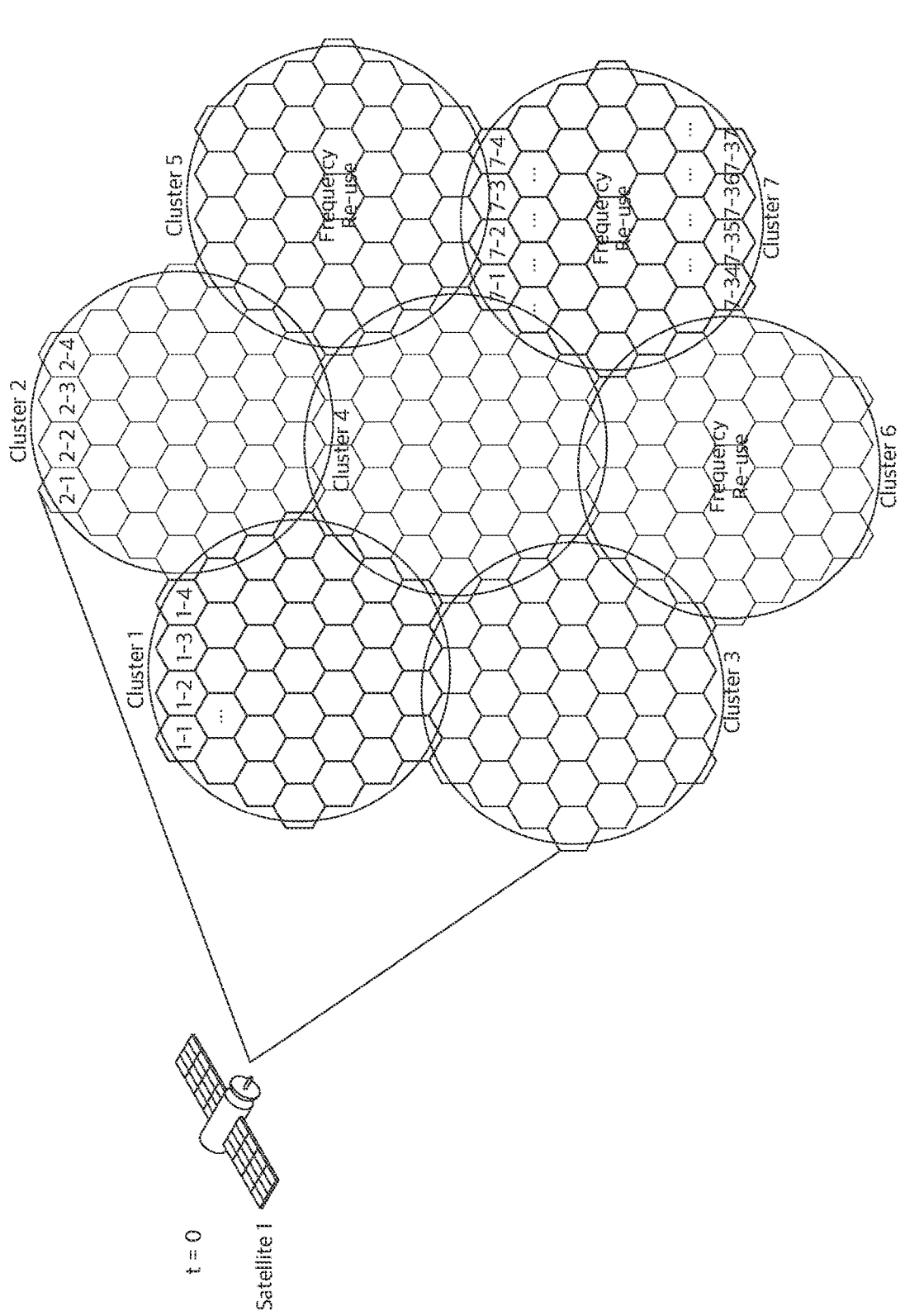
Figure 4B:
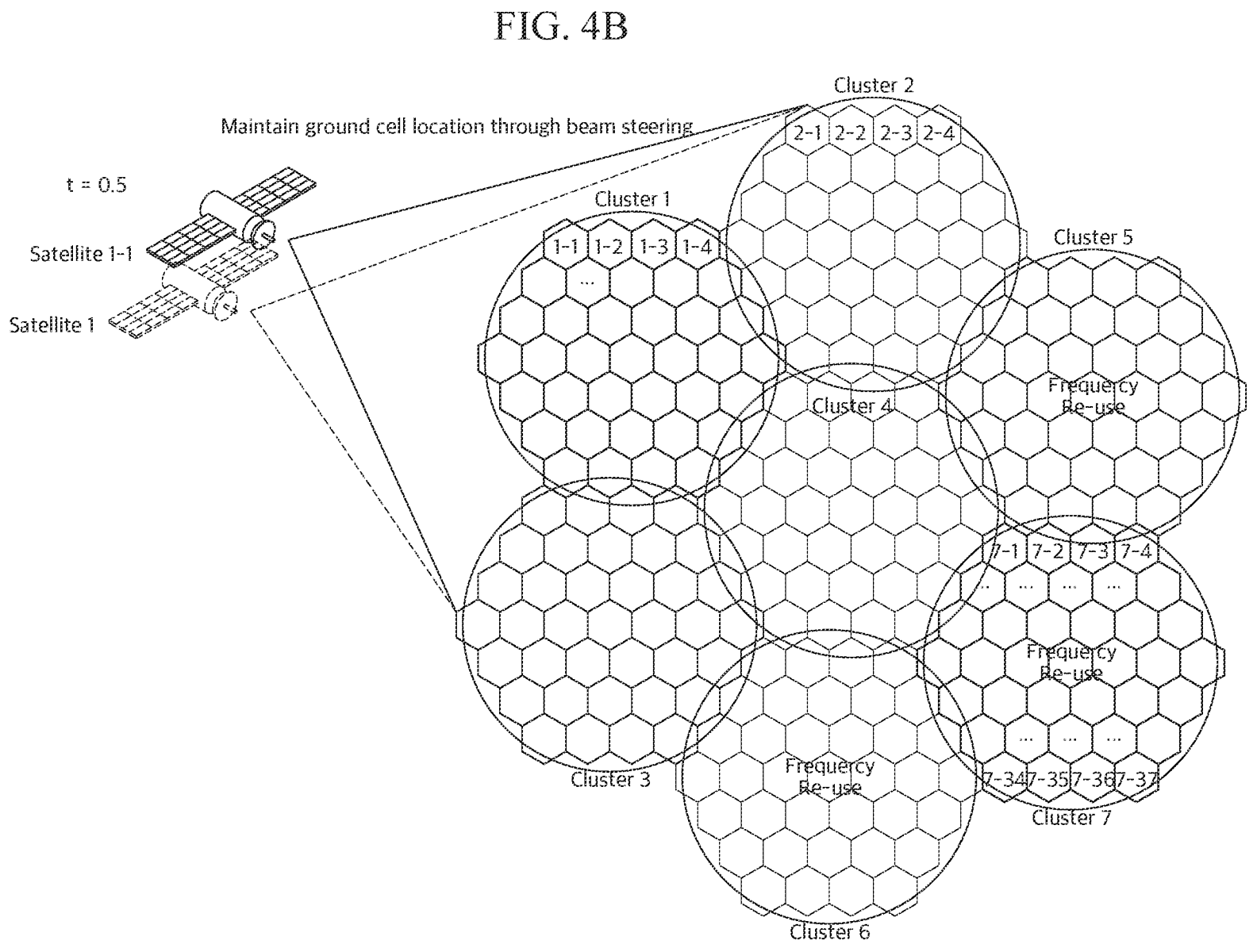

Referring to FIG. 4A, at a moment of t=1, a satellite 1 may transmit a beam to support communication of a ground terminal included in an area corresponding to a cluster 1 through a cluster 7. Referring to FIG. 4B, at a moment of t=0.5, although the satellite 1 moves to a position of a satellite 1-1, beam hopping technology according to a steering function of an electronically steerable antenna (ESA) may be applied to the satellite 1. At this point, an area corresponding to the cell and the cluster which are on a ground may not be changed. In other words, unlike the cell and the cluster moving with the movement of the satellite in FIG. 3, the area corresponding to the cell and the cluster may not be changed regardless of the movement of the satellite in FIG. 4B. At this point, unique identification information may be allocated to the cell and the cluster, and although the satellite 1 moves to the position of the satellite 1-1, the unique identification information on the cell and the cluster which are covered by the satellite may remain identical.

Referring to FIG. 4C, at a moment of t=1.0, with the satellite 1-1 moving from the position of the satellite 1-1 to a position of a satellite 1-2, at least one cell corresponding to a second area 410 may not be covered by a beam transmitted from the satellite 1-2 despite the steering function of the ESA. In this case, the at least one cell corresponding to the second area 410 may be covered by a beam transmitted from a satellite 2. In other words, communication of ground terminals included in cells corresponding to the second area 410 may be supported by the beam transmitted from the satellite 2. At this point, the ground terminals included in the second area 410 may perform only a handover between satellites from the satellite 1 to the satellite 2 to perform the communication without changing cell and cluster numbers. For example, ground terminals included in a cell 3-16, a cell 3-23, a cell 3-29, and a cell 34 through a cell 3-37 in the cluster 3 as well as a cell 6-16, a cell 6-23, a cell 6-29, and a cell 6-34 through a cell 6-37 in the cluster 6 may perform the handover between satellites from the satellite 1 to the satellite 2 by using identical cell and cluster numbers without changing the cell and cluster numbers.

At this point, since each satellite may identify its own position based on a global positioning system (GPS) or the like, it may be expected that the satellite 1-1 does not support communication with the ground terminals included in the cells corresponding to the second area 410 with the satellite 1-1 moving to the position of the satellite 1-2. Since satellites perform communication with a satellite adjacent thereto, the satellite 1-1 may identify information on the satellite 2 which is scheduled to cover the cells corresponding to the second area 410. Thus, when communicating with a ground station through a control channel, the satellite 1-1 may transmit information on the cells corresponding to the second area 410 and the information on the satellite 2 which is scheduled to cover the cells corresponding to the second area 410 together to the ground station. Therefore, unlike in related arts, the ground terminals included in the cells corresponding to the second area 410 may perform only the handover between satellites by using a unique cell number and cluster number.

Figure 4D:
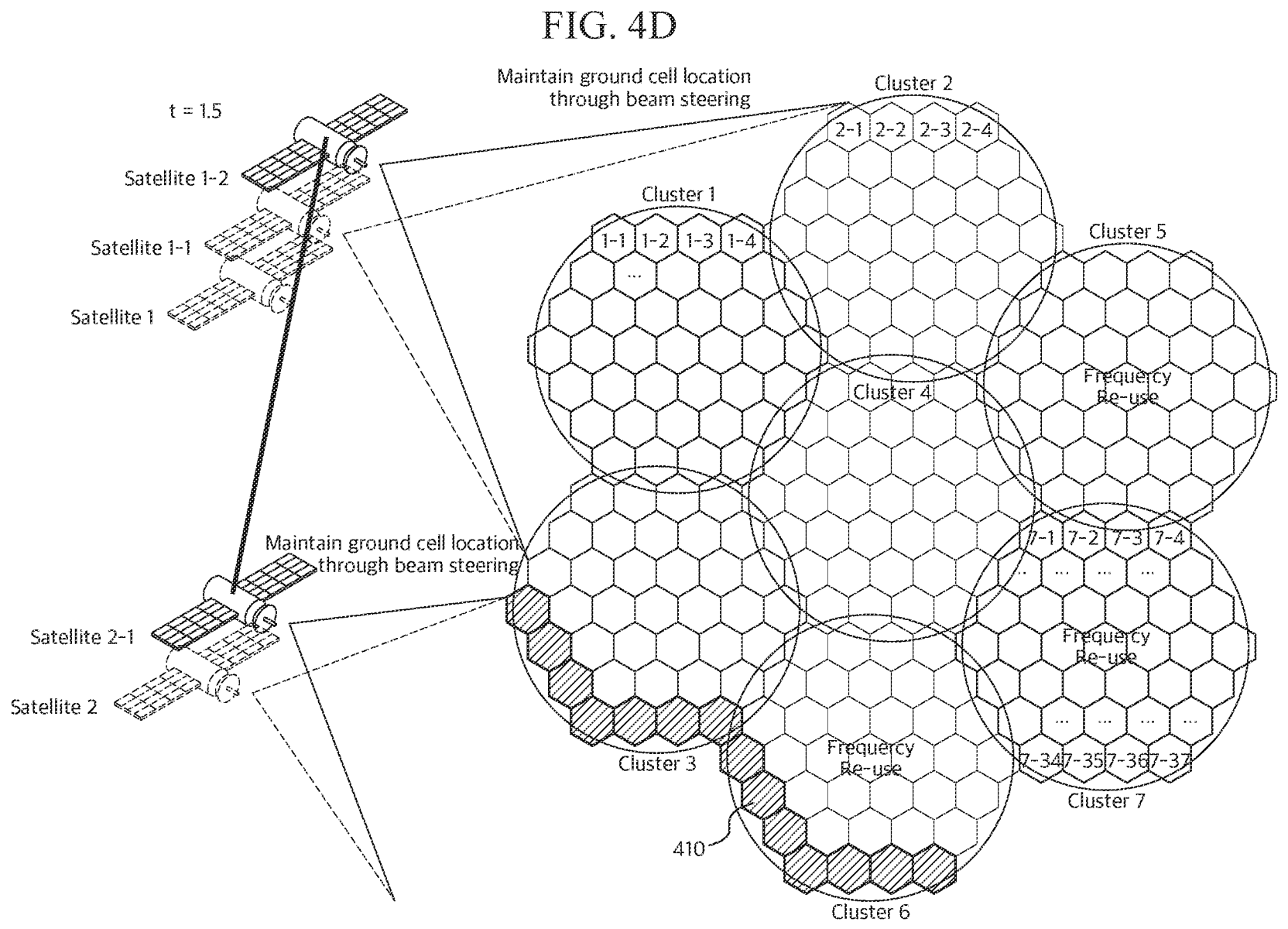

Referring to FIG. 4D, at a moment of t=1.5, although the satellite 2 moves to a position of a satellite 2-1, the cell and the cluster covered by the satellite through the steering function of the ESA may be identical to those of the moment of t=1.0. Similarly, at the moment of t=1.5, although the satellite 1-1 moves to the position of the satellite 1-2, the cell and the cluster covered by the satellite through the steering function of the ESA may be identical to those of the moment of t=1.0.

Figure 4E:
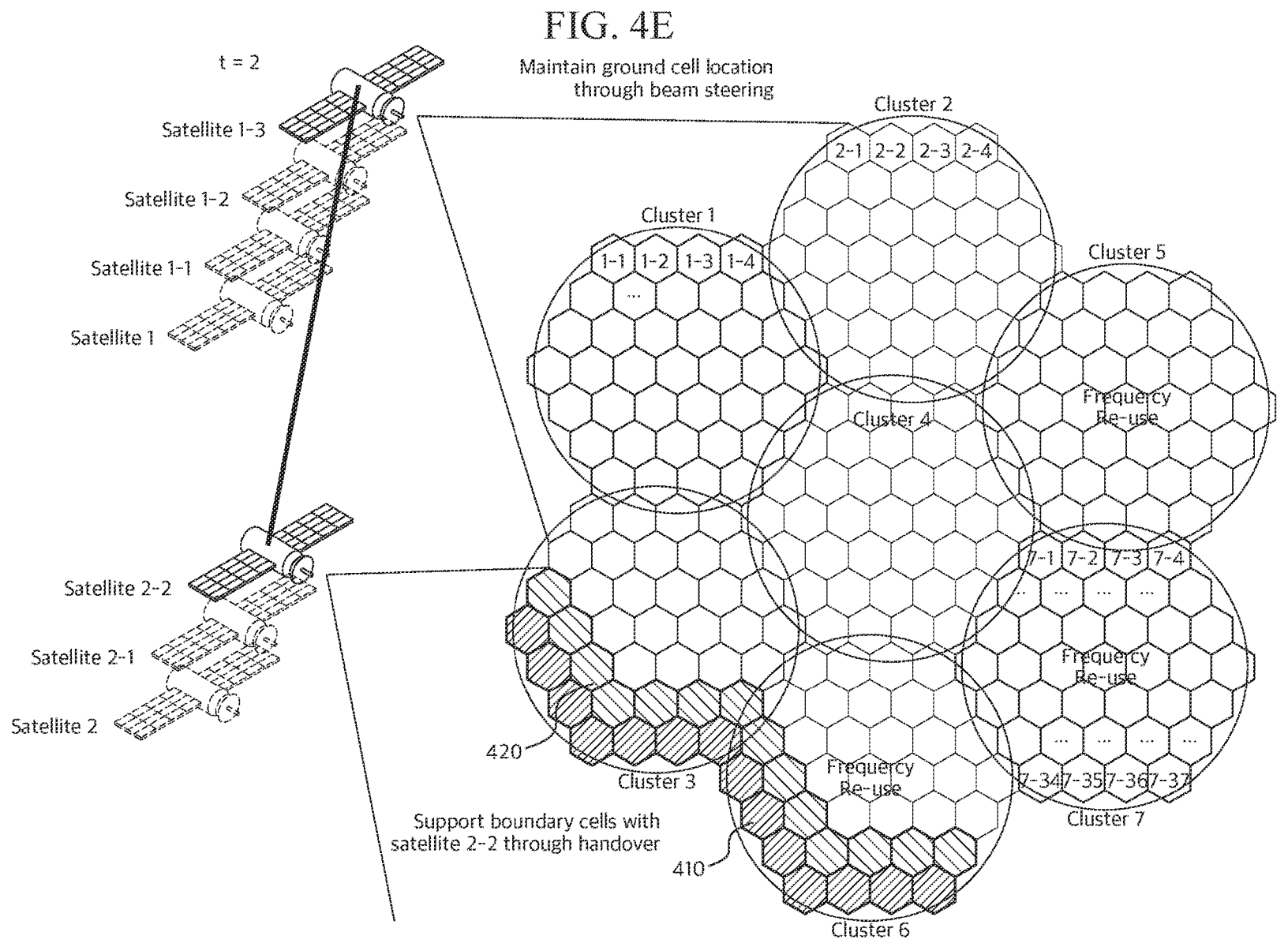

Referring to FIG. 4E, at a moment of t=2.0, with the satellite 1-2 moving to a position of a satellite 1-3, at least one cell corresponding to a second area 420 as well as the at least one cell corresponding to the second area 410 may not be covered by a beam transmitted by the satellite despite the steering function of the ESA. In other words, the second area 420 which is not covered by the satellite 1-3 may be additionally generated with movement of the satellite 1-2 from the position of the satellite 1-2 to the position of the satellite 1-3, and communication of ground terminals included in the second area 420 may be supported by a satellite 2-2. In other words, the at least one cell corresponding to the second area 420 as well as the at least one cell corresponding to the second area 410 may be covered by a beam transmitted from the satellite 2-2. Even in this case, unlike in related arts, ground terminals included in cells corresponding to the second area 420 may perform only the handover between satellites by using the unique cell number and cluster number. For example, ground terminals included in a cell 3-10, a cell 3-17, a cell 3-24, and a cell 3-30 through a cell 3-33 in the cluster 3 as well as a cell 6-10, a cell 6-17, a cell 6-24, and a cell-30 through a cell 6-33 in the cluster 6 may perform only the handover between satellites from the satellite 1 to the satellite 2 without changing the cell and cluster numbers to perform communication.

In other words, the cluster number and the cell number are unique values fixed at a predetermined ground location regardless of the movement of the satellite. Satellites may change numbers of a steered cluster and cell with moving to a location, and ground terminals may perform only the handover between satellites without performing a handover between cells and a handover between clusters. Thus, a network controller may further easily process network management and resource allocation.

FIG. 5 is a flowchart illustrating an operation method of a network controller according to an example embodiment.

Referring to FIG. 5, in operation S510, the network controller may identify identification information corresponding to each of at least one cell. Identification information on a cell fixed at a predetermined ground location may correspond to a unique number set in advance regardless of movement of a satellite. In other words, although the satellite moves, a cell number covered by the satellite may be unchangeable unique identification information.

In operation S520, the network controller may identify identification information corresponding to each of at least one cluster including the at least one cell. When an area covered by one beam transmitted from the satellite is a cell, a plurality of cells covered by applying beam hopping technology of changing a steering point over a time may be included in a cluster. For example, a cluster 1 may include an area corresponding to a cell 1-1 through a cell 1-37. At this point, similarly to the cell, the cluster which is fixed at a predetermined ground location may correspond to a unique number as the identification information regardless of the movement of the satellite. In other words, although the satellite moves, a cluster number covered by the satellite may be unchangeable unique identification information.

In operation S530, the network controller may identify identification information corresponding to at least one cluster and at least one cell corresponding to a first area covered by a beam transmitted from a first satellite. In other words, the network controller may identify the identification information corresponding to the at least one cluster and the at least one cell corresponding to the first area in which the first satellite may support communication of a ground terminal.

In operation S540, the network controller may identify identification information corresponding to at least one cluster and at least one cell corresponding to a second area not covered by the beam due to movement of the first satellite.

When the first satellite moves, the second area not to be covered by the first satellite may be generated despite hopping the beam with a beam steering function, and the network controller may identify the identification information corresponding to the at least one cluster and the at least one cell corresponding to the second area. For example, the network controller may identify information on the second area which corresponds to a cell 3-16, a cell 3-23, a cell 3-29, and a cell 34 through a cell 3-37 in a cluster 3 as well as a cell 6-16, a cell 6-23, a cell 6-29, and a cell 6-34 through a cell 6-37 in a cluster 6 that may not be covered by the first satellite with the movement of the first satellite.

At this point, although the first satellite moves, a plurality of ground terminals included in the second area may perform communication by using a second satellite without changing a cell number and a cluster number. In other words, the plurality of ground may perform the communication regardless of the movement of the first satellite and based on the unique identification information which is on the cell and the cluster. As an example, although the first satellite moves, a plurality of ground terminals included in the cell 3-16 in the cluster 3 may perform communication by using an identical cell number and cluster number through the second satellite. As another example, although the first satellite moves, a plurality of ground terminals included in the cell 6-34 in the cluster 6 may perform communication by using an identical cell number and cluster number through the second satellite.

In operation S550, the network controller may identify information on the second satellite which covers the second area. It may be expected that the first satellite may not support communication corresponding to the second area based on a GPS. For example, it may be expected that the first satellite may not support communication of the plurality of ground terminals included in the second area corresponding to the cell 3-16 in the cluster 3 with the movement of the first satellite.

At this point, the first satellite and the second satellite may perform communication with each other. Through this, the first satellite may identify the information on the second satellite which is scheduled to cover the second area. The network controller may transmit the information on the second area and the information on the second satellite to a ground station through a control channel. At this point, the network controller may be provided to the satellite, the ground station, or another position in which a communication support is required in addition thereto.

The second satellite may support the communication of the plurality of ground terminals included in the second area. For example, the communication of the plurality of ground terminals included in the cell 3-16 in the cluster 3 included in the second area may be supported by the second satellite other than the first satellite.

Thus, although the satellite moves, ground terminals may perform only a handover between satellites without performing a handover between cells and a handover between clusters by using a unique cell number and cluster number fixed at a predetermined ground location regardless of the movement of the satellite. In this regard, the network controller may further easily process network management and resource allocation.

Figure 6:
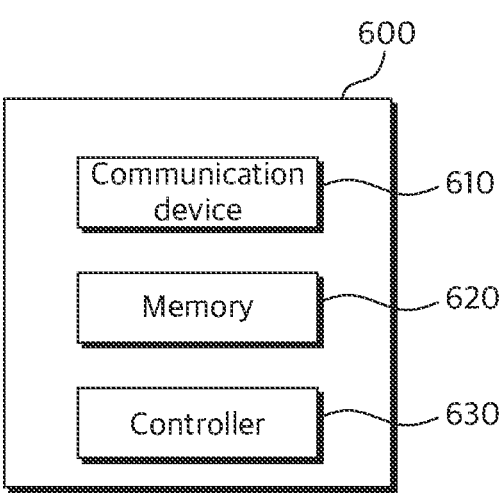
FIG. 6 is a block diagram illustrating a network controller according to an example embodiment.

FIG. 6 is a block diagram illustrating a network controller according to an example embodiment. Elements associated with example embodiments of the present disclosure are illustrated in FIG. 6, but it is merely an example. Other elements in general use may be further included in addition to the elements illustrated by FIG. 6. Redundant descriptions may be omitted.

An electronic device 600 illustrated by FIG. 6 may be an apparatus included in a network controller and may be provided to a satellite. Referring to FIG. 6, the electronic device 600 may include a communication device 610, a memory 620, a controller 630, and a bus (not illustrated). The memory 620 and the controller 630 may communicate with each other through the bus. Each of the memory 620 and the controller 630 may be a unit processing at least one function or operation and may be implemented by hardware, software, or a combination thereof.

In example embodiments, the electronic device 600 may include the memory 620 in which a variety of data is stored. For example, identification information corresponding to each of at least one cell and identification information corresponding to each of at least one cluster may be stored in the memory 620. Alternatively, at least one instruction for an operation of the electronic device 600 may be stored in the memory 620. In this case, the memory 620 and the controller 630 may perform various operations based on the instruction as such. The controller 630 may perform the above-described operations with the instruction stored in the memory 620 being executed in the controller 630. The memory 620 may be a volatile memory or a non-volatile memory. For example, data that has been processed or to be processed in a processor (not illustrated) may be stored in the memory 620. The memory 620 may include a random access memory (RAM) such as a dynamic random access memory (DRAM) or a static random access memory (SRAM), a read-only memory (ROM), an electrically erasable programmable read-only memory (EEPROM), a compact disc (CD)-ROM, an optical disc storage including Blu-ray, a hard disk drive (HDD), a solid state drive (SSD), or a flash memory.

In example embodiments, the instruction is executed in the controller 630. The controller 630 may identify identification information corresponding to at least one cluster and at least one cell corresponding to a first area covered by a beam transmitted from a first satellite, identify identification information corresponding to at least one cluster and at least one cell corresponding to a second area not covered by the beam due to movement of the first satellite, and identify information on a second satellite covering the second area.

The electronic device or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt integrated circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims. It will be apparent to those skilled in the art that various modifications and variations can be made in the embodiments without departing from the spirit or scope of the invention. Thus, it is intended that the present invention cover the modifications and variations of this invention provided they come within the scope of the appended claims and their equivalents.

What is claimed is:

1. An operation method performed in a network controller, the operation method comprising:

identifying identification information corresponding to each of at least one cell;

identifying identification information corresponding to each of at least one cluster including the at least one cell;

identifying identification information corresponding to at least one cluster and at least one cell corresponding to a first area covered by a beam transmitted from a first satellite;

identifying identification information corresponding to at least one cluster and at least one cell corresponding to a second area not covered by the beam due to movement of the first satellite; and identifying information on a second satellite covering the second area.

2. The operation method of claim 1, wherein the identification information corresponding to the at least one cluster and the at least one cell corresponding to the second area is unique identification information set in advance regardless of the movement of the first satellite.

3. The operation method of claim 2, wherein a plurality of ground terminals included in the second area is configured to perform communication regardless of the movement of the first satellite and based on the unique identification information which is on a cluster and a cell.

4. The operation method of claim 1, wherein the identifying of the information on the second satellite comprises identifying the information on the second satellite which is scheduled to cover the second area based on communication between the first satellite and the second satellite.

5. The operation method of claim 4, further comprising transmitting information on the second area and the information on the second satellite through a control channel.

6. The operation method of claim 5, wherein the second satellite is configured to support communication of a plurality of ground terminals included in the second area.

7. The operation method of claim 1, wherein a cell corresponding to the first area corresponds to an area covered by the beam transmitted from the first satellite, and a cluster corresponding to the first area corresponds to an area covered by hopping the beam.

8. The operation method of claim 7, wherein the second area is an area not covered by the beam with the movement of the first satellite despite hopping the beam.

9. A non-transitory computer-readable storage medium comprising a medium configured to store computer-readable instructions, wherein when executed by a controller, the computer-readable instructions allow the controller to perform an operation method in a network controller, the operation method comprising:

identifying identification information corresponding to each of at least one cell;

identifying identification information corresponding to each of at least one cluster including the at least one cell;

identifying identification information corresponding to at least one cluster and at least one cell corresponding to a first area covered by a beam transmitted from a first satellite;

identifying identification information corresponding to at least one cluster and at least one cell corresponding to a second area not covered by the beam due to movement of the first satellite; and identifying information on a second satellite covering the second area.

10. An electronic device comprising:

a communication device;

a memory in which identification information corresponding to each of at least one cell and identification information corresponding to each of at least one cluster; and a controller configured to identify identification information corresponding to at least one cluster and at least one cell corresponding to a first area covered by a beam transmitted from a first satellite, identify identification information corresponding to at least one cluster and at least one cell corresponding to a second area not covered by the beam due to movement of the first satellite, and identify information on a second satellite covering the second area.

* * * * *